Patented Dec. 28, 1937

2,103,612

UNITED STATES PATENT OFFICE 2,103,612

TREATMENT OF CHOCOLATE

William Clayton, Sydney Back, James Frederick Morse, and Robert Ian Johnson, London, England, assignors to Crosse & Blackwell Limited, London, England, a British company No Drawing. Application January 15, 1937, Serial No. 120,822. In Great Britain January 18, 1936

8 Claims. (Cl. 99—23)

This invention relates to improvements in treatment of chocolate and materials for addition thereto.

According to this invention it has been found that the fluidity and/or bloom resistance of chocolate can be improved by addition of small quantities of oxidized and/or polymerized glycerides containing initially a major proportion of a mono-unsaturated di-saturated glyceride of the oleodistearin type e. g. oleopalmitostearin. The invention also includes methods for the manufacture of the said modified glycerides though it is not limited to the use of modified glycerides so prepared.

The preferred raw material is cacao butter which is oxidized and preferably polymerized, but similar raw materials may be used such as "premier jus".

Example 1

448 lbs. of cacao butter are placed in a gas fired stainless steel pan, fitted with a thermostat and a stainless steel coil for blowing in air.

The temperature is raised to 250° C. and air is blown in, 1,000 to 1,500 cu. ft. per hour being employed; these conditions are maintained and the reaction products leave the pan through an exhaust duct, being discharged into the air.

Different products are obtained depending on the extent to which the treatment is carried.

The following properties of the different types of modified glycerides may be used to determine at what stage the process should be stopped.

| Property | Modified glyceride A (oxidized) | Modified glyceride AB (oxidized and polymerized) | Modified glyceride B (oxidized and substantially completely polymerized) |
|---|---|---|---|
| Molecular weight | 1050–1150 | 1250–1350 | Above 1500 |
| Iodine value | 23–24 | 20–22 | 20–22 |
| Time of reaction (hours) | 4–5 | 7–8 | Over 9 |

The point at which the reaction is stopped will depend on the desired properties of the product, and the values given above refer only to one range of products under certain conditions (type of pan, volume of air, temperature, catalysts, etc.) and where products of slightly different properties are required, the reaction may be stopped when the molecular weight has attained values outside those limits given above.

Where a preponderance of modified glyceride A is required in the modified glyceride AB, it is desirable to carry out the reaction in an aluminium pan and in the absence of catalysts, such as iron. If a modified glyceride B is required, a suitable iron salt (iron oleate) may be added to give an iron concentration of 50 to 60 parts per million and the presence of this amount of iron may reduce the reaction time by half.

The oxidation may be carried out by any other suitable method (e. g. acetic acid/hydrogen peroxide mixtures), the modified glyceride A thus formed being subsequently taken to any desired degree of polymerization to give the AB or B forms. The polymerization of the oxidized product (A or AB) may be performed by heating in absence of air, with or without agitation.

Example 2

The above products are added to a standard chocolate having the following composition:—

|   | Percent by weight |
|---|---|
| Cacao particles | 5 |
| Sugar | 45 |
| Milk solids | 20 |
| Total fat | 30 |

(a) Effect on fluidity (mobility)

|   | Mobility |
|---|---|
| No addition | 100 |
| Addition 0.4% of A | 187 |
| Addition 0.4% of AB | 150 |
| Addition 0.4% of B | 32.5 |

(b) Effect on bloom

The protection afforded against fat bloom is more pronounced in a plain couverture. A chocolate containing 37% fat and 46% sugar may be rendered highly resistant to fat bloom by the addition of .5% AB and centres so covered may be kept at an elevated temperature (25° C.) for a period of months. Modified glycerides A and B protect to a lesser extent, though A has little or no effect.

The preferred addition for both purposes is the modified glyceride AB having a typical analysis as follows:—

| Molecular weight | 1350 |
|---|---|
| Iodine value | 20 |
| Free fatty acids percent | 1.1 |
| Oxidized fatty acids do | 14 |
| Acetyl value | 56 |

This effect on fat bloom is very important in practice. As well as improving the appearance, the addition of modified glyceride allows the time of conching to be reduced.

We declare that what we claim is:—

1. Process of treating chocolate which consists in incorporating a small proportion of an oxidized mono-unsaturated disaturated glyceride.
2. Process of treating chocolate which consists in incorporating a small proportion of a polymerized oxidized mono-unsaturated disaturated glyceride of the oleodistearin type.
3. Process of treating chocolate which consists in incorporating a small proportion of oxidized cacao butter.
4. Process of treating chocolate which consists in incorporating a small proportion of polymerized oxidized cacao butter.
5. Chocolate containing a small proportion of an oxidized mono-unsaturated disaturated glyceride.
6. Chocolate containing a small proportion of a polymerized oxidized mono-unsaturated disaturated glyceride of the oleodistearin type, whereby its tendency to bloom is reduced.
7. Chocolate containing 0.1 to 1 per cent of oxidized cacao butter.
8. Chocolate containing 0.1 to 1 per cent of polymerized oxidized cacao butter.

WILLIAM CLAYTON.
SYDNEY BACK.
JAMES FREDERICK MORSE.
ROBERT IAN JOHNSON.